(12) United States Patent
Shin et al.

(10) Patent No.: US 10,201,798 B2
(45) Date of Patent: Feb. 12, 2019

(54) POLYMERIZATION REACTOR

(71) Applicant: LG Chem, Ltd., Seoul (KR)

(72) Inventors: Hyun Jin Shin, Daejeon (KR); Young Soo Song, Daejeon (KR); Ye Hoon Im, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/557,971

(22) PCT Filed: Mar. 17, 2016

(86) PCT No.: PCT/KR2016/002633
§ 371 (c)(1),
(2) Date: Sep. 13, 2017

(87) PCT Pub. No.: WO2016/148498
PCT Pub. Date: Sep. 22, 2016

(65) Prior Publication Data
US 2018/0050318 A1     Feb. 22, 2018

(30) Foreign Application Priority Data

Mar. 17, 2015     (KR) .................. 10-2015-0036568

(51) Int. Cl.
*B01J 19/20* (2006.01)
*B01J 8/38* (2006.01)
*C08F 2/01* (2006.01)

(52) U.S. Cl.
CPC ............. *B01J 19/20* (2013.01); *B01J 8/38* (2013.01); *B01J 8/382* (2013.01); *C08F 2/01* (2013.01);

(Continued)

(58) Field of Classification Search
CPC ........ B01J 19/1875; B01J 19/20; B01J 8/386; B01J 8/382; C08F 2/01
See application file for complete search history.

(56) References Cited

U.S. PATENT DOCUMENTS 3,567,402 A     3/1971   Christensen
4,388,447 A     6/1983   Iwamoto et al.
(Continued)

FOREIGN PATENT DOCUMENTS

GB     1404163 A     8/1975
JP     5545799 B2    7/2014
(Continued)

OTHER PUBLICATIONS

International Search Report from PCT/KR2016/002633 dated Jun. 21, 2016.
(Continued)

*Primary Examiner* — Lessanework Seifu
(74) *Attorney, Agent, or Firm* — Lerner, David, Littenberg, Krumholz & Mentlik, LLP

(57) ABSTRACT

The present invention relates to a polymerization reactor. The polymerization reactor according to one aspect of the present invention comprises: a housing including a supply part for supplying a reactant; a tube which is provided inside the housing and extends along the height direction of the housing; a first impeller including a blade which spirally surrounds the tube along the height direction of the housing; a second impeller which is provided inside the housing in order to enable the reactant to flow into the tube; and a partition wall which is provided to surround the second impeller along the circumferential direction.

18 Claims, 2 Drawing Sheets

(52) U.S. Cl.
CPC ............. *B01J 2219/00051* (2013.01); *B01J 2219/00164* (2013.01)

(56) References Cited

U.S. PATENT DOCUMENTS

| | | | |
|---|---|---|---|
| 4,921,906 A * | 5/1990 | Meyer | ............ B01J 19/1875 422/135 |
| 5,182,087 A | 1/1993 | Lilja et al. | |
| 6,319,996 B1 | 11/2001 | Burke et al. | |
| 7,906,018 B2 | 3/2011 | Essemiani et al. | |
| 2007/0159919 A1 | 7/2007 | Kim et al. | |
| 2008/0214751 A1 | 9/2008 | Galewski | |

FOREIGN PATENT DOCUMENTS

| | | |
|---|---|---|
| KR | 2005-0050620 A | 5/2005 |
| KR | 10-0760159 B1 | 10/2007 |
| KR | 2015-0097128 A | 8/2015 |

OTHER PUBLICATIONS

Extended European Search Report including Written Opinion for Application No. EP16765254.4 dated Jul. 11, 2018.

* cited by examiner

[Figure 1]
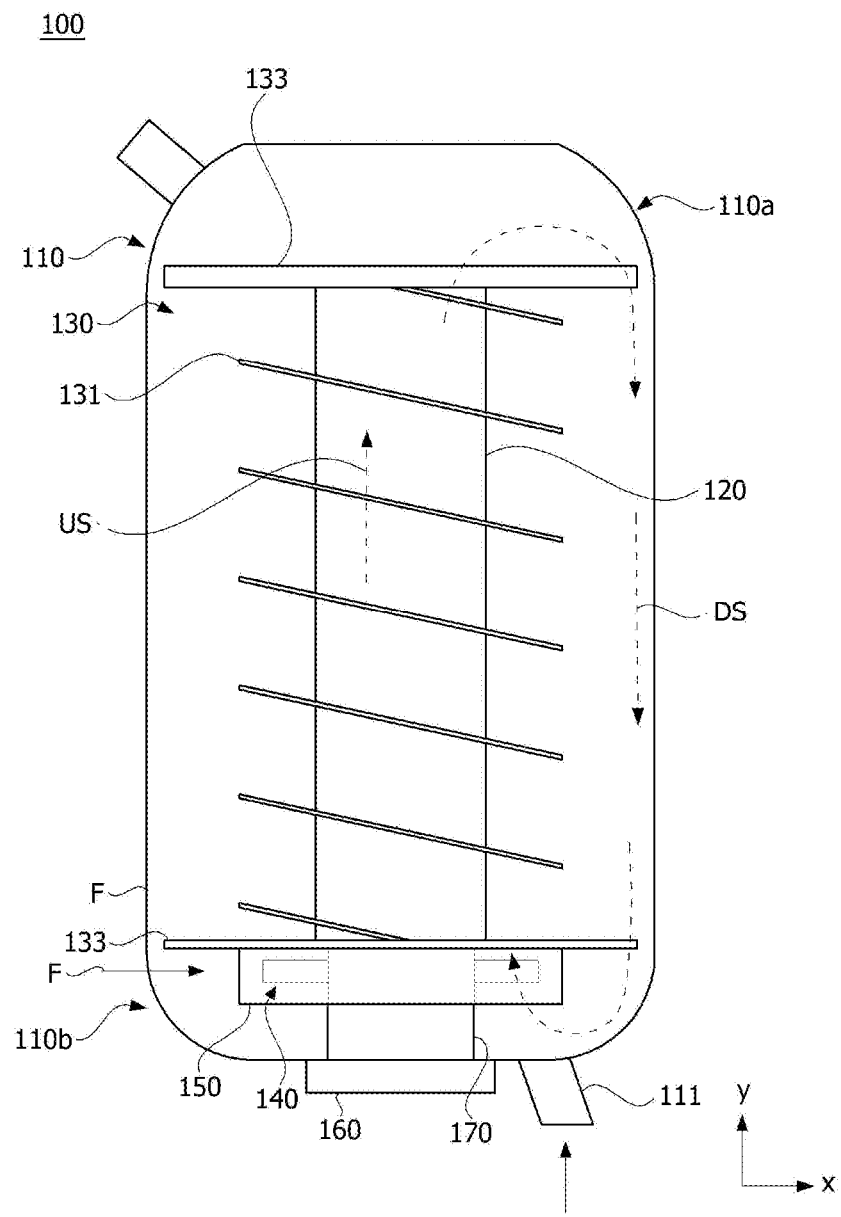

[Figure 2]
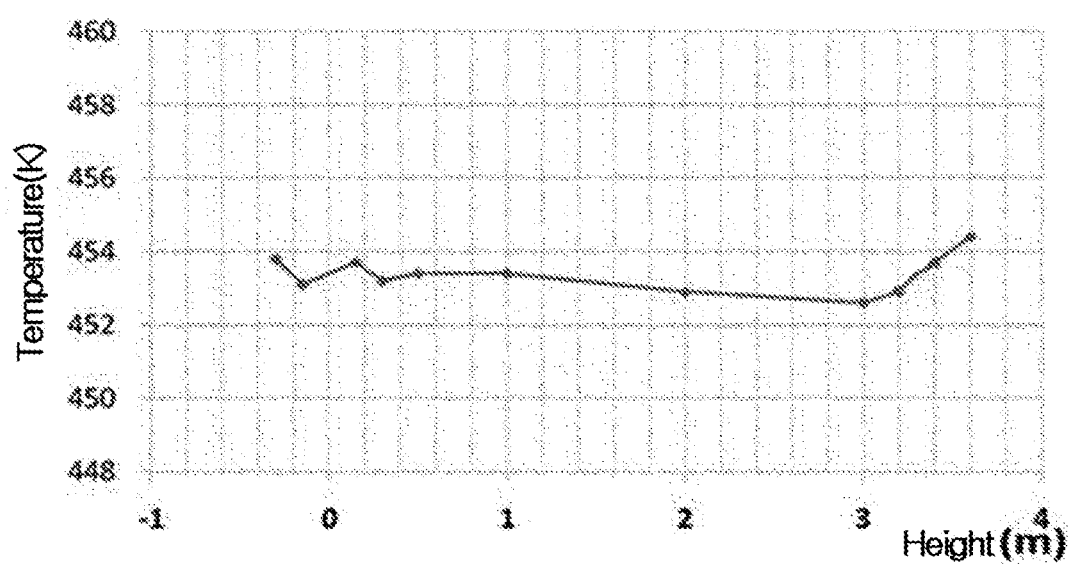

POLYMERIZATION REACTOR

CROSS-REFERENCE TO RELATED APPLICATION

This application is a national phase entry under 35 U.S.C. § 371 of International Application No. PCT/KR2016/002633, filed Mar. 17, 2016, which claims priority to Korean Patent Application No. 10-2015-0036568, filed Mar. 17, 2015, the disclosures of which are incorporated herein by reference.

TECHNICAL FIELD

The present invention relates to a polymerization reactor, specifically a polymerization reactor which can reduce the difference between the upper temperature and the lower temperature in the reactor.

BACKGROUND ART

Generally, in the case of a polymer reactor handling high viscous solutions a helical impeller is used. In addition, a draft tube is used to enhance an up-and-down stream inside the reactor. Furthermore, in the case of using a pressurized monomer liquefied to a low temperature, the temperature at the lower part of the reactor on which a supply line is located is lowered more than the temperatures of other parts.

Usually, a catalyst that activates a polymerization reaction is mixed in the supply line or injected into a site adjacent to the supply line. Such a catalyst is activated by receiving heat through mixing a bulk solution at elevated temperature under polymerization.

Here, if the temperature at the lower part of the reactor is so low that the difference between the upper temperature and the lower temperature increases, the quality degradation due to bad polymerization reaction occurs, and the conversion ratio of the monomer decrease. Therefore, a polymerization reactor is required, which can smoothly activate the reaction by reducing the difference between the upper temperature and the lower temperature in the reactor.

DISCLOSURE

Technical Problem

The present invention provides as a problem to be solved a polymerization reactor which can reduce the difference between the upper temperature and the lower temperature in the reactor.

In addition, the present invention provides as a problem to be solved a polymerization reactor which can increase the temperature of the lower part in the reactor.

Furthermore, the present invention provides as a problem to be solved a polymerization reactor which can improve polymerization quality and a conversion ratio of a monomer.

Technical Solution

In order to solve the above described problems, according to one aspect of the present invention, a polymerization reactor is provided, which comprises a housing including a supply part for supplying a reactant; a tube which is provided inside the housing and extends along the height direction of the housing; a first impeller including a blade which spirally surrounds the tube along the height direction of the housing; a second impeller which is provided inside the housing in order to enable the reactant to flow into the tube; and a partition wall which is provided to surround the second impeller along the circumferential direction.

Also, according to another aspect of the present invention, a polymerization reactor is provided, which comprises a housing including a supply part for supplying a reactant; a tube which is provided inside the housing and extends along the height direction of the housing; a first impeller, including a blade which spirally surrounds the tube along the height direction of the housing, for rotating to form an upward stream of the reactant inside the tube and to form a downward stream of the reactant in a space between the tube and the housing; a partition wall which is provided in a lower region of the housing to guide the reactant downward streaming from the space between the tube and the housing into the tube; and a second impeller, which is disposed inside the partition wall, for enabling the reactant to flow into the tube.

Furthermore, according to another aspect of the present invention, a polymerization reactor is provided, which comprises a housing including a supply part for supplying a reactant; a tube which is provided inside the housing and extends along the height direction of the housing; a first impeller, including a blade which spirally surrounds the tube along the height direction of the housing, for rotating to form an upward stream of the reactant inside the tube and to form a downward stream of the reactant in a space between the tube and the housing; a partition wall which is provided in a lower region of the housing to guide the reactant downward streaming from the space between the tube and the housing into the tube; and a second impeller, which is disposed inside the partition wall, for enabling the reactant to flow into an upper part of the tube and being driven at a rotational speed faster than that of the first impeller.

Advantageous Effects

As described above, the polymerization reactor related to one embodiment of the present invention has the following effects.

By providing the lower part of the reactor with the partition wall, it can lead to effective mixing of the low temperature reactant and the high temperature bulk solution. Accordingly, by raising the temperature at the lower part of the reactor, it is possible to reduce the difference between the upper temperature and the lower temperature in the reactor.

In addition, it is possible to improve polymerization quality and the conversion ratio of the monomer.

BRIEF DESCRIPTION OF THE DRAWINGS

FIG. 1 is a schematic diagram illustrating a polymerization reactor related to one embodiment of the present invention.

FIG. 2 is a graph of simulation results in the polymerization reactor shown in FIG. 1.

MODE FOR INVENTION

Hereinafter, the polymerization reactor according to one embodiment of the present invention will be described in detail with reference to the attached drawings.

In addition, the same or corresponding components are given by the same or similar reference numerals, regardless of the reference numerals in the drawings, for which the repeated explanation will be omitted, and for convenience of explanation the size and shape of each illustrated structural member may be exaggerated or reduced.

FIG. 1 is a schematic diagram showing a polymerization reactor (100) related to one embodiment of the present invention, and FIG. 2 is a graph of simulation results of the polymerization reactor shown in FIG. 1.

Referring to FIG. 1, the polymerization reactor (100) related to one embodiment of the present invention includes a housing (110) and a tube (120) and a first impeller (130) and a second impeller (140) and a partition wall (150).

The housing (110) provides a reaction space of reactants therein. In addition, the housing (110) is provided with a supply part (111) for the supply of reactants. In addition, the housing (110) may be divided into an upper region (110a) and a lower region (110b) on the basis of the height direction (y-axis direction). The term upward stream (US) herein means the flow from the upper region to the lower region, and the term downward stream (DS) means the flow from the lower region to the upper region. The housing (110) may be provided with at least one supply part (111, F). In addition, each of the supply parts (111, F) may be provided to feed reactants and/or catalysts to different positions inside the housing (110). In addition, a variety of materials required for the polymerization reaction may be fed to at least one supply part. For example, any one of supply parts (111) may be provided in the lower region (110b) of the housing (110). The supply part (111) is provided to supply reactants into the lower region (110b) of the housing (110). In addition, any one of supply parts (F) may be provided to feed reactants and/or catalysts to the side of the first impeller (130).

The tube (120) is provided inside the housing (110). In addition, the tube (120) has a structure extending along the height direction of the housing (110). In addition, the tube (120) may be a draft tube. The tube (120) performs a function to strengthen an up-and-down stream in the reaction space. The tube (120) may be a vertically opened hollow cylinder. The diameter of the tube (120) is set smaller than the diameter of the housing (110).

The first impeller (130) includes a blade (131) spirally surrounding the tube (120) along the height direction of the housing (110). The first impeller (130) can be a helical ribbon type impeller. For example, the first impeller (130) can include a plurality of side axes erected parallel to the tube (120). The side axes support the blade (131). In addition, the first impeller (130) may include a plurality of connection members (133) for supporting the upper and lower ends of the side axes, respectively. The connecting member (133) may be a ring-shaped plate and have a plurality of flow holes.

Furthermore, the first impeller (130) is rotated to form an upward stream (US) of the reactant inside the tube (120) and to form a downward stream (DS) of the reactant in the space between the tube (120) and the housing (110). Specifically, by rotation of the first impeller (130), the upward steam. (US) of the reactant is formed inside the tube (1.20) and the downward stream (DS) of the reactant is formed in the space between the tube (120) and the housing (110). That is, the first impeller (130) is provided by its rotation to form the upward stream (US) of the reactant inside the tube (120) and to form the downward stream (DS) of the reactant in the space between the tube (120) and the housing (110). In particular, the first impeller (130) adjacent to an inner peripheral surface of the housing (110) may have a wide diameter to enhance an up-and-down agitation force and it may be adjacent to the inner peripheral surface of the housing (110) to improve fluidity near the inner peripheral surface of the housing (110).

In addition, the second impeller (140) is provided inside the housing (110) in order to enable the reactant to flow into the tube (120). The second impeller (140) can be composed of various impellers capable of resulting in mixing, and for example, the second impeller (140) may be a paddle impeller. The second impeller (140) may comprise a plurality of paddles arranged along the circumferential direction.

In addition, the partition wall (150) is provided to surround the second impeller (140) along the circumferential direction. The partition wall (150) may be a hollow (hereinafter, also referred to as "first space") cylinder. A first space surrounded by the partition wall (150) and located by the second impeller (140), forms a flow space of the reactant, where the reactant may flow into the lower part of the tube (120) via the first space.

In addition, the partition wall (150) is provided in the lower region of the housing (110) to guide the reactant resulting in the downward stream (DS) (particularly, also referred to as hulk solution) in the space between the tube (120) and the housing (110), inside the tube (120). Specifically, the bulk solution resulting in the downward stream (DS) in the space between the tube (120) and the housing (110) may flow into the tube (120) only through the first space of the partition wall (150). At this time, the second impeller (140) is disposed inside the partition wall (150), thereby performing a function to enable reactants fed into the housing (110) via the supply part (111) and the aforementioned bulk solution to flow into the tube. Specifically, the second impeller (140) enables the reactants introduced into the partition wall (150) to flow into the upper part of the tube (120).

As described above, the second impeller (140) is provided in the lower region (110b) of the housing (110), and at least one supply part (111) is provided in the lower region (110b) of the housing (110) such that the reactants are fed into the partition wall (150). Through the structure as above, the reactant supplied into the housing (110) via the supply part (111) is mixed with the reactant (bulk solution) resulting in the downward stream (DS) along the space between the tube (120) and the housing (110), in the lower region (110b) of the housing, particularly, the first space of the partition wall (150), and then raised through the tube (120). In addition, the temperature of the reactant introduced into the supply part (ill) is low, but the temperature of the bulk solution is high, so that the temperature at the lower region of the reactor (100) may be raised.

In addition, the first impeller (130) and the second impeller (140) are provided at different heights along the height direction of the housing (110), respectively. Also, the tube (120) and the partition wall (150) are provided at different heights along the height direction of the housing (110), respectively.

Referring to FIG. 1, the farther the partition wall (150) is from the tube (120), it may be provided to have the higher diameter. In addition, the farther the partition wall (150) is from the tube (120), the partition wall (150) may be a hollow cylinder having the increased diameter, as described above.

In addition, the partition wall (150) may be provided such that an edge having a maximum diameter is spaced from an inner peripheral surface of the housing (110). Also, the partition wall (150) may be provided such that its minimum diameter is equal to the diameter of the tube (120). Otherwise, the partition wall (150) may be provided such that its minimum diameter is larger than the diameter of the tube (120). In addition, the partition wall (150) may be provided such that its center is coaxially located on the center of the tube (120). Moreover, the diameter of the second impeller (140) may be set smaller than the diameter of the first impeller (130). In addition, the maximum diameter of the partition wall (150) may be set smaller than the diameter of the blade (131). In addition, the partition wall (150) may be integrally formed with the tube (120). For example, a part of the lower region of the tube (120) may form the partition wall (150). In addition, the tube (120) and the partition wall (150) may be integrally formed, the partition wall (150) may be supported by a drive axis (170) of the first impeller, and the partition wall (150) and the tube (120) may be spaced at a predetermined interval along the height direction as well.

Furthermore, the first impeller (130) and the second impeller (140) may be provided such that each rotational center is coaxially positioned. In addition, the rotational centers of the first and second impellers (130, 140) and the center of the tube (120) and the center of the partition wall (150) may be provided such that all the centers are coaxially located.

In addition, the first impeller (130) and the second impeller (140) may be provided such that the rotational speeds are set to be different from each other. In particular, the temperature rise in the lower region of the reactor (100) can be achieved through mixing of a relatively low temperature reactant and a relatively high temperature bulk solution, and to effectively achieve such a mixing, it is important to agitate them through the second impeller (140). Therefore, in order to enhance the agitation force through the second impeller (140), it is preferred that the rotational speed of the second impeller (140) is set faster than the rotational speed of the first impeller (130). Specifically, the second impeller (140) inside the partition wall (150) is driven at a rotational speed faster than that of the first impeller (130).

Besides, the first impeller (130) and the second impeller may be mounted on individual drive axes, respectively. In addition, each drive axis may be driven via an individual drive part.

Alternatively, the first impeller (130) and the second impeller (140) may be mounted on a single drive axis (170), respectively. In this case, the rotational speed of any one of impellers may be set differently from the rotational speed of the other impeller through a deceleration part. Also, the drive axis (170) is connected to a drive part (160) such as a motor.

Furthermore, the height of the first impeller (130) may be provided to be equal to the height of the tube (120).

Referring to FIG. 2, it can be seen that the temperature in the lower region of the reactor (100) rises through mixing of the relatively low temperature reactant fed via the supply part (111) and the relatively high temperature bulk solution. In addition, it can be seen that the difference between the upper temperature and the lower temperature along the height direction of the reactor (100) is reduced.

Preferred embodiments of the present invention as described above have been disclosed for illustrative purposes, and it will be possible for those skilled in the art, having the ordinary knowledge of the present invention, to make various modifications, alterations, and additions within thought and scope of the present invention, where such modifications, alterations and additions will be regarded as falling within the following claims.

INDUSTRIAL APPLICABILITY

The polymerization reactor related to one embodiment of the present invention can improve quality and the conversion ratio of the monomer.

The invention claimed is:

1. A polymerization reactor comprising
a housing including a supply part for supplying a reactant;
a tube which is provided inside the housing and extends along the height direction of the housing;
a first impeller including a blade which spirally surrounds the tube along the height direction of the housing;
a second impeller which is provided inside the housing in order to enable the reactant to flow into the tube; and
a partition wall which is provided to surround the second impeller along the circumferential direction,
wherein
the second impeller is provided in a lower region of the housing, and
the farther the partition wall is from the tube, the partition wall is provided to have a higher diameter.

2. The polymerization reactor according to claim 1, wherein
the supply part is provided in the lower region of the housing such that the reactant is fed into the partition wall.

3. The polymerization reactor according to claim 1, wherein
the partition wall is provided such that an edge having a maximum diameter is spaced from an inner peripheral surface of the housing.

4. The polymerization reactor according to claim 1, wherein
the partition wall is provided such that its minimum diameter is equal to the diameter of the tube.

5. The polymerization reactor according to claim 1, wherein
the partition wall is provided such that its center is coaxially located on the center of the tube.

6. The polymerization reactor according to claim 1, wherein
the partition wall is integrally formed with the tube.

7. The polymerization reactor according to claim 1, wherein
the first impeller is rotated to form an upward stream of the reactant inside the tube and to form a downward stream of the reactant in a space between the tube and the housing.

8. The polymerization reactor according to claim 1, wherein
the second impeller is a paddle impeller.

9. The polymerization reactor according to claim 1, wherein
the first impeller and the second impeller are provided such that each rotational center is coaxially positioned.

10. The polymerization reactor according to claim 9, wherein
the first impeller and the second impeller are provided such that their rotational speeds are set to be different from each other.

11. The polymerization reactor according to claim 10, wherein
the rotational speed of the second impeller is set faster than the rotational speed of the first impeller.

12. The polymerization reactor according to claim 9, wherein
the first impeller and the second impeller are mounted on individual drive axes, respectively.

13. The polymerization reactor according to claim 9, wherein
the first impeller and the second impeller are mounted on a single drive axis, respectively.

14. The polymerization reactor according to claim 1, wherein
the height of the first impeller is provided to be equal to the height of the tube.

15. A polymerization reactor comprising
a housing including a supply part for supplying a reactant;
a tube which is provided inside the housing and extends along the height direction of the housing;
a first impeller, including a blade which spirally surrounds the tube along the height direction of the housing, for rotating to form an upward stream of the reactant inside the tube and to form a downward stream of the reactant in a space between the tube and the housing;
a partition wall which is provided in a lower region of the housing to guide the reactant downward streaming from the space between the tube and the housing into the tube; and
a second impeller, which is disposed inside the partition wall, for enabling the reactant to flow into the tube,
wherein
the second impeller is provided in a lower region of the housing, and
the farther the partition wall is from the tube, the partition wall is provided to have a higher diameter.

16. The polymerization reactor according to claim 15, wherein
the supply part is provided in the lower region of the housing such that the reactant is fed into the partition wall.

17. The polymerization reactor according to claim 15, wherein
the partition wall is provided such that its minimum diameter is equal to the diameter of the tube, and
the partition wall is provided such that an edge having a maximum diameter is spaced from an inner peripheral surface of the housing.

18. A polymerization reactor comprising
a housing including a supply part for supplying a reactant;
a tube which is provided inside the housing and extends along the height direction of the housing;
a first impeller, including a blade which spirally surrounds the tube along the height direction of the housing, for rotating to form an upward stream of the reactant inside the tube and to form a downward stream of the reactant in a space between the tube and the housing;
a partition wall which is provided in a lower region of the housing to guide the reactant downward streaming from the space between the tube and the housing into the tube; and
a second impeller, which is disposed inside the partition wall, for enabling the reactant to flow into an upper part of the tube and being driven at a rotational speed faster than that of the first impeller,
wherein
the second impeller is provided in a lower region of the housing, and
the farther the partition wall is from the tube, the partition wall is provided to have a higher diameter.

* * * * *